United States Patent
Kania et al.

(10) Patent No.: US 11,425,501 B2
(45) Date of Patent: Aug. 23, 2022

(54) DEVICE FOR ELECTROINICALLY CONNECTING AND DISCONNECTING PORTIONS OF AN ELECTRICAL LINE, PUBLIC ADDRESS SYSTEM, METHOD FOR DETECTING A FAILURE IN AN ELECTRICAL LINE

(71) Applicant: Honeywell International Inc., Morris Plains, NJ (US)

(72) Inventors: Horst Kania, Neuss (DE); Josef Schreiner, Neuss (DE)

(73) Assignee: Honeywell International Inc., Charlotte, NC (US)

( * ) Notice: Subject to any disclaimer, the term of this patent is extended or adjusted under 35 U.S.C. 154(b) by 225 days.

(21) Appl. No.: 16/226,236

(22) Filed: Dec. 19, 2018

(65) Prior Publication Data

US 2019/0200129 A1 Jun. 27, 2019

(30) Foreign Application Priority Data

Dec. 19, 2017 (EP) .................................. 17208620

(51) Int. Cl.
*H04R 3/12* (2006.01)
*H04R 29/00* (2006.01)
(Continued)

(52) U.S. Cl.
CPC ............... *H04R 3/12* (2013.01); *H01H 47/00* (2013.01); *H04R 27/00* (2013.01); *H04R 29/007* (2013.01);
(Continued)

(58) Field of Classification Search
CPC ........ H04R 3/12; H04R 27/00; H04R 29/007; H01H 47/00
See application file for complete search history.

(56) References Cited

U.S. PATENT DOCUMENTS 4,864,519 A * 9/1989 Appleby ............... G08B 25/003 700/292
4,956,563 A * 9/1990 Schornack ............. H02J 9/062 307/66

(Continued)

FOREIGN PATENT DOCUMENTS

CN 2751312 Y 1/2006
CN 101916986 12/2010
(Continued)

OTHER PUBLICATIONS

Extended Search Report from related EP Application 17208620.9 dated Jun. 6, 2019 (5 pages).
(Continued)

*Primary Examiner* — Alex Torres-Rivera
(74) *Attorney, Agent, or Firm* — Brooks, Cameron & Huebsch, PLLC

(57) ABSTRACT

The present disclosure includes devices, systems, and methods for electrically connecting and disconnecting portions of an electrical line of a public address system. One device includes a switch configured to electrically connect and disconnect a first and a second contact point, wherein the first and the second contact point are configured to be electrically connected to respective portions of the electrical line, a controller configured to control the switch based on at least one electrical characteristic at the first and/or second contact point, and a power supply configured to be electrically connected to the first contact point via the switch.

20 Claims, 4 Drawing Sheets

Figure 1:
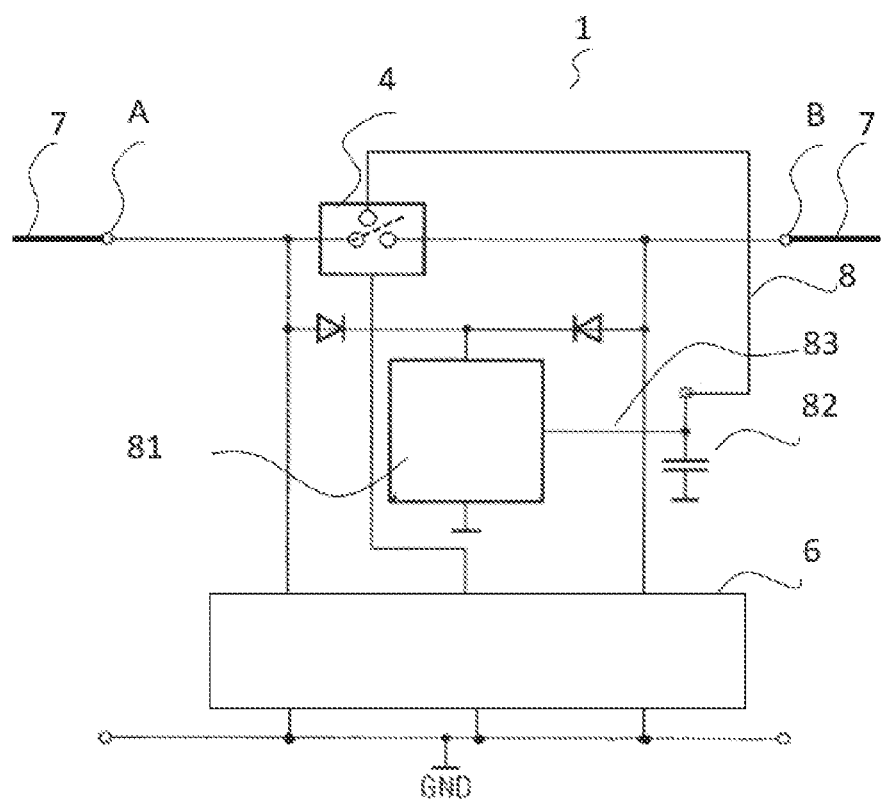

(51) Int. Cl.
 *H01H 47/00* (2006.01)
 *H04R 27/00* (2006.01)
 *H02J 7/00* (2006.01)

(52) U.S. Cl.
 CPC ............. *H02J 7/00* (2013.01); *H04R 29/00* (2013.01); *H04R 2227/00* (2013.01)

(56) References Cited

U.S. PATENT DOCUMENTS

| | | | |
|---|---|---|---|
| 8,094,426 B2 | 1/2012 | Kellis et al. | |
| 8,278,882 B2 | 10/2012 | Gotou et al. | |
| 9,525,350 B2 | 12/2016 | Hari et al. | |
| 2008/0181436 A1* | 7/2008 | Leach | H04R 27/00 381/123 |
| 2010/0232080 A1* | 9/2010 | Schermann | G08B 25/04 361/90 |
| 2013/0236031 A1* | 9/2013 | Risberg | H04R 1/24 381/98 |
| 2014/0029754 A1* | 1/2014 | Muller | H04R 29/007 381/58 |
| 2015/0091544 A1* | 4/2015 | Jayaraj | H02M 3/156 323/284 |
| 2015/0381039 A1* | 12/2015 | Hari | H02M 3/1582 323/271 |
| 2017/0054306 A1 | 2/2017 | Vo et al. | |
| 2018/0068647 A1* | 3/2018 | Kim | G10K 15/02 |
| 2018/0175812 A1* | 6/2018 | Polarouthu | H03F 1/0211 |
| 2019/0006855 A1* | 1/2019 | MacDonald | H04R 27/00 |

FOREIGN PATENT DOCUMENTS

| | | |
|---|---|---|
| CN | 103778755 | 5/2014 |
| CN | 105372549 | 3/2016 |
| CN | 105870879 | 8/2016 |
| CN | 106199306 | 12/2016 |
| CN | 106771784 | 5/2017 |
| EP | 2184827 B1 | 12/2015 |
| EP | 2701132 B1 | 7/2018 |
| EP | 2833333 B1 | 12/2018 |
| JP | 2000090370 | 3/2000 |

OTHER PUBLICATIONS

Ji Chun, et al., "Analysis on Handling Short Circuit Faults of Electric Circuit"; Heilongjiang Technology Information, Dec. 31, 2010 (2 pgs).

First Office Action for related Chinese Application No. 201811555454, dated Dec. 1, 2020 (10 pgs) (English Translation Only).

* cited by examiner

DEVICE FOR ELECTROINICALLY CONNECTING AND DISCONNECTING PORTIONS OF AN ELECTRICAL LINE, PUBLIC ADDRESS SYSTEM, METHOD FOR DETECTING A FAILURE IN AN ELECTRICAL LINE

CROSS REFERENCE TO RELATED APPLICATION

This application claims priority to EP Application No. 17208620.9 filed Dec. 19, 2017, which is incorporated herein by reference in its entirety.

The invention relates to a device for electrically connecting and disconnecting portions of an electrical line of a public address system, a public address system and a method for detecting a failure in an electrical line of a public address system.

STATE OF THE ART

Public address systems in public areas, which are used for danger or hazard alarms, underlie high safety and quality standards. More specifically, public address systems comprising loudspeakers connected via a line to a control and audio output module which is configured to output a preferably constant pilot tone and an audio signal to the line have to be configured such that a short-circuit and/or a line breakage does/do not lead necessarily to a failure of the whole public address system.

It is known from the EP 2 584 792 A1 to implement a loudspeaker line examination system for the above public address systems by applying a pilot signal, which is combined with the audio signal and supplied to the loudspeaker line from control and audio output module. Output signals of a current detecting circuit and a voltage detecting circuit disposed in the control and audio output module are analysed and an impedance at the frequency of the pilot signal is computed to detect a line breakage or a decrease in impedance of the loudspeaker line.

EP 2 203 912 B1 discloses a connecting/disconnecting device for an electrical line of a public address system. The connecting/disconnecting devices includes a monitoring unit for checking electric characteristics of portion of the electrical line, an energy storage device coupled to the monitoring unit such that the function of the monitoring unit can be maintained in case of a failure of electrical line, and a switching element, which is coupled to the monitoring unit and which is equipped such that in case of a failure of the electrical line the electrical line can be separated.

In case of a short circuit during the operation of the above public address system all the connecting/disconnecting devices will detect a failure, i.e. a fault, and disconnect all portions of the electrical line. Since the control and audio output module continues to supply the pilot tone to the first portion of the electrical line, the first connecting/disconnecting device will detect the presence of the pilot signal and close again the switching means. Subsequently the next connecting/disconnecting device along the loop will receive the pilot signal and close its switching means. This process will continue until reaching the connecting/disconnecting device adjacent to the failure. This connecting/disconnecting device will close the switching means, detect the fault and immediately will open the switching means again. This connecting/disconnecting device will such memorize that it is located immediately adjacent to the fault.

Due to the switching into the fault the other connecting/disconnecting devices located along the loop between the control and audio output module and the connecting/disconnecting device adjacent to the fault will open their switching means again, and the sequential closing procedure will have to start again. However, this time the connecting/disconnecting means located immediately adjacent to the fault will not close its switching means.

Subsequently, the pilot signal is applied from the other side of the loop to the electrical line by the control and audio output module, as well, and the sequence of closing the switching means and connecting respective portions of the electrical line will be performed for the remaining part of the electrical line. At the end, all connecting/disconnecting devices will have their switching means closed, apart of the two connecting/disconnecting devices immediately adjacent to the fault.

Nevertheless, with an increasing number of connecting/disconnecting devices connected to the electric line of the public address system it takes a long time to sequentially connect the respective portions of the electrical line. During this time the operation of the public address system is impaired.

OBJECT(S) OF THE INVENTION

In the light of the above, it is an object of the present invention to provide a device for electrically connecting and disconnecting portions of an electrical line of a public address system, a public address system, and a method for detecting a failure in an electric line of a public address system being able to reduce the time for re-establishing the operation of the public address system after a detection of a fault.

The above described object is solved with a device according to claim 1, a system according to claim 9, and a method according to claim 11. The dependent claims are directed to different advantageous aspects of the invention.

Solutions

According to the invention there is provided a connecting/disconnecting device for electrically connecting and disconnecting portions of an electrical line of a public address system. The device comprises a switching means (e.g., a switch) which is configured to electrically connect and disconnect a first and a second contact point, wherein the first and the second contact points are configured to be electrically connected to respective portions of the electrical line, a control means (e.g., a controller) which is configured to control the switching means based on at least one electrical characteristic at the first and/or second contact point, a power supply means (e.g., a power supply) configured to be electrically connected to the first contact point via the switching means, wherein the switching means is configured to switch between (a) a first configuration where the first contact point and the power supply means are electrically connected with each other while the first and the second contact points are electrically disconnected from each other, and (b) a second configuration where the first contact point and the power supply means are electrically disconnected while the first and the second contact points are electrically connected with each other.

Since in the first configuration the local power supply means is connected with at least one of the contact points and with the corresponding portion of the electrical line so as to apply electrical power to the portion of the line between its own connecting/disconnecting device and the next connecting/disconnecting device along the electrical line, and since the control means monitors an electrical characteristic of this portion of the line, it is possible to determine the presence or absence of a fault—like a short circuit or a line breakage—in this portion of the electrical line adjacent to the connecting/disconnecting device. Since this determining can be done simultaneously by all the connecting/disconnecting devices arranged along the loop of the public address system, the portion of the line with the fault can be identified almost immediately and the other connecting/disconnecting devices, not immediately adjacent to the fault portion, can switch into the second configuration so as to re-establish the operation of the line.

Preferably the connecting/disconnecting device further comprises a transforming and rectifying means which is electrically connected to at least one of the first and the second contact points and is configured to transform alternating current supplied via the electrical line into direct current, and a charging means for charging a power source connected to the power supply means with the direct current.

Since the power supply means is connected with a power source, which in turn is charged through the electrical line during normal operation—preferably using the power provided by a pilot signal with a frequency outside the audible range—the connecting/disconnecting device of the invention can operate in a reliable and effective manner for a long time without the need of exchanging a battery.

Furthermore, in a preferred embodiment the control means is further configured to control the switching means such that the switching means switches from the second to the first configuration when a voltage at the first contact point is lower than a predetermined threshold value and/or a voltage at the second contact point is lower than the predetermined threshold value.

To use the voltage as electrical characteristic to be monitored allows a simple and economic design of the connecting/disconnecting device.

It is further preferred, that the switching means comprises a first switch and a second switch electrically connected to each other in series between the first contact point and the second contact point.

By providing two switches and preferably by connecting the power supply means at a point between the two switches in the first configuration, it is possible to apply the electrical power from the power supply means either in a clockwise direction of the loop, e.g. by closing the right hand switch only, or in a counter clockwise direction by closing the left hand switch only. Preferably, the connecting/disconnecting devices along the loop are configured to simultaneously adopt the first configuration with the left hand switches closed and subsequently a modified first configuration with the right hand switches closed. As a result, each connecting/disconnecting device will have checked whether the two portions of the electrical line, which are connected to the two contact points, are free from faults or not.

In a further advantageous embodiment the control means is further configured to store timing information concerning the at least one electrical characteristic at the first and/or the second contact points.

These historical data can be very helpful in further analysing the fault developments of the electrical line, e.g. in case of a creeping short or line breakage.

It is additionally preferred, that the power supply means is configured to apply at least one DC pulse, preferably a DC pulse pattern, to the electrical line, and the control means is configured to control the switching from the first to the second configuration depending on the detection of the DC pulse or the DC pulse pattern received via the electrical line, in order to detect the absence of a short-circuit and/or a line breakage.

When using a capacitor as a power source connected via the power supply means it is easy to provide a DC pulse to a contact point and to the line, and it is equally easy to detect such a DC pulse arriving at the other contact point through the line. If on the other hand no DC pulse is received within a predetermined waiting period, the connecting/disconnecting device determines that the portion of the line connected to the monitored contact point is defect.

In a preferred embodiment, the connecting/disconnecting device comprises a resetting means for setting the connecting/disconnecting device into a default mode, an orientation determining means for determining in the default mode at which contact point a pilot tone or a switching instruction from a control and audio output module of the system is detected first, and a configuration setting means for setting the contact point receiving the pilot tone or the switching signal first as a first contact point and the other contact point as a second contact point.

The connecting/disconnecting device in the preferred embodiment will synchronously monitor the portions of the electrical line in a clockwise direction and subsequently in a counter clockwise direction. After installing the public address system the individual connecting/disconnecting devices however can not know, which one of their contact points is the one located in the clock wise direction and which one is located in the counter clockwise direction. Therefore, in order to determine the orientation of the connecting/disconnecting devices these devices are brought into a default state, for example by pressing a dedicated switch button provided on the device, while no pilot signal is applied from the control and audio output module and while the power supply means does not supply power to the contact points. Subsequently the pilot signal is output or the control and audio output module will output switching pulses to initiate the closing of the switches, the connecting/disconnecting devices will sequentially close there switches and will at that occasion determine the side which closing the switch first. In this manner the connecting/disconnecting devices will determine their orientation in the loop. The configuration setting means will set the contact point having the switch first closed as the first contact point and will set the other contact point as the second contact point.

In the preferred embodiment the system will be implemented with a two-wire bus system, i.e. so that two wire loops are implemented and the loudspeakers are arranged between these loops. Each of the connecting/disconnecting devices is configured to interrupt both loops.

According to the invention the public address system comprises a plurality of connecting/disconnecting devices as described above, an electrical line comprising a plurality of portions connecting the plurality of connecting/disconnecting devices to each other, a plurality of a loudspeakers connected in parallel on the line, and an control and audio output module connected to the electrical line and configured to output an audio signal to the electrical line.

The control and audio output module is further configured to output a pilot signal to the electrical line, wherein the pilot signal is preferably in a range from 10 Hz to 25 kHz, more preferably in a range from 10 Hz to 20 Hz, furthermore preferably in a range from 20 kHZ to 25 kHZ, most preferably at 22 kHz, and the control means of the individual connecting/disconnecting devices are configured to control the switching means based on the pilot signal.

The pilot is preferably in a frequency range outside the audible range and can be used to provide the necessary power to charge a power source connected with the power supply means, thus arriving at an efficient and reliable design.

According to the invention there is provided a method for detecting a failure in the electrical line of the public address system as described above. The method comprises a first step of switching the switching means of the connecting/disconnecting devices described above from the second configuration into the first configuration upon detecting an interruption of the pilot signal, a second step of applying by the respective power supply means electrical power to the respective portions of the electrical line via the respective first contact points, a third step of measuring at least one electrical characteristic at the first and/or the second contact points in order to determine the absence of a short-circuit and/or a line breakage in the respective portion of the electrical line, and a fourth step of either switching from the first configuration into the second configuration, if the third step detects the absence of a short-circuit and/or a line breakage in the respective portion of the electrical line, or keeping the first configuration if the third step detects a short-circuit and/or a line breakage in the respective portion of the electrical line.

While in the above method reference is made to the first contact points, it goes without saying that instead of starting with the first contact points it is possible to start with the second contact points, as long as all connecting/disconnecting devices provided along the loop simultaneously behave equal.

In case of using a two wired loop there will be a total of four contact points, two in each loop. That is, there will be two first contact points and two second contact points. The above method will then be carried out twice, once for each loop.

According to a preferred embodiment the method further comprising a fifth step of switching the switching means in a third configuration where the second contact point and the power supply means are electrically connected with each other, while the first and the second contact point are electrically disconnected from each other, and while the first contact point and the power supply means are electrically disconnected from each other, a sixth step of applying by the respective power supply means electrical power to the respective portions of the electrical line via the respective contact points, and a seventh step of measuring at least one electrical characteristic at the first and/or the second contact point in order to determine the absence of a short-circuit and/or a line breakage in the respective line portions; wherein the fifth to seventh steps are carried out between the third and the fourth step.

With this implementation each connecting/disconnecting device will determine the presence/absence of a fault in the portion of the electrical line connected to the first contact point and the presence/absence of a fault in the portion of the electrical line connected to the second contact point. Thus it is possible to surely locate and isolate the fault and to re-establish the operation of the public address system.

It is further preferred that the switching means comprises a first switch corresponding to the first contact point and a second switch corresponding to the second contact point and a loudspeaker terminal for connecting the loudspeaker provided between the first switch and the second switch, wherein the first switch is switched based on the electrical characteristic at the first point, and the second switch is switched based on the electrical characteristic at the second point.

With this configuration it is possible to isolate the fault in the line portion while maintaining all loudspeakers operative.

As discussed above, each of the power supply means of the connecting/disconnecting devices preferably applies at least one DC pulse, preferably a DC pulse pattern, to the line, and each of the control means carries out in the third step and/or seventh step several voltage measurements corresponding to the DC pulse, preferably to the DC pulse pattern, in order to detect the absence of a short-circuit and/or a line breakage at the respective portion of the electrical line.

It is further preferred that results of each measurement are stored in a storage of the respective connecting/disconnecting device.

This allows to implement a historical database, which can be used when inspecting the public address system, in order to identify creeping shorts or line breakings, i.e. a deterioration of the electrical line over the time.

Upon detecting a short circuit in one loop of the two wired loop configuration the corresponding connecting/disconnecting device will keep the switches directed towards the short circuit in a configuration isolating the respective portion of the lines for both loops.

DETAILED DESCRIPTION OF EMBODIMENTS

Figure 2:
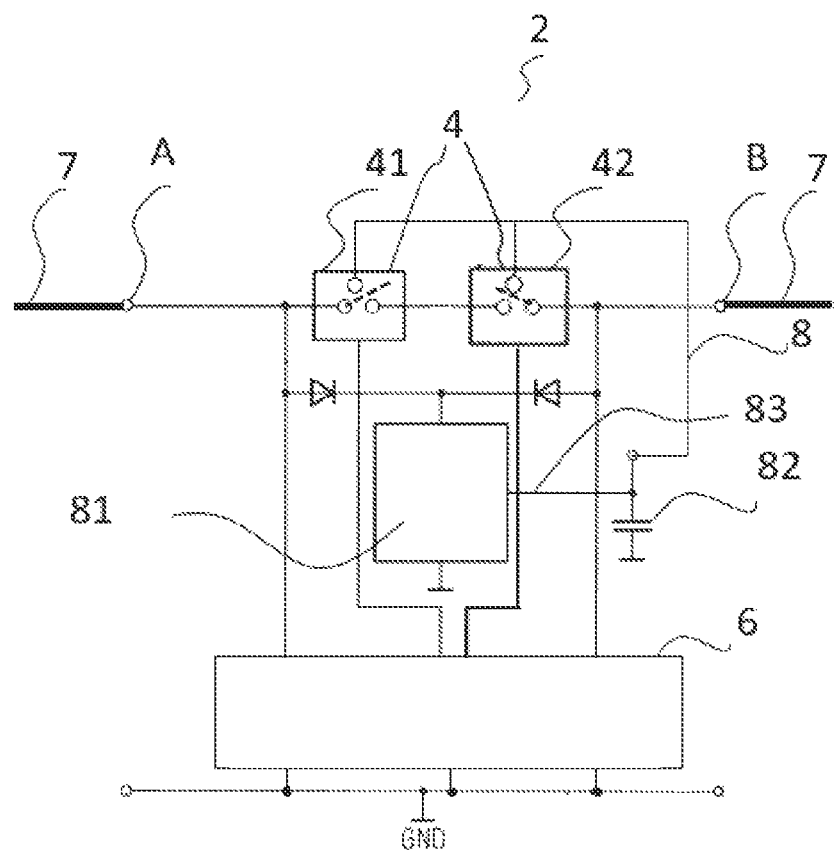
Figure 3:
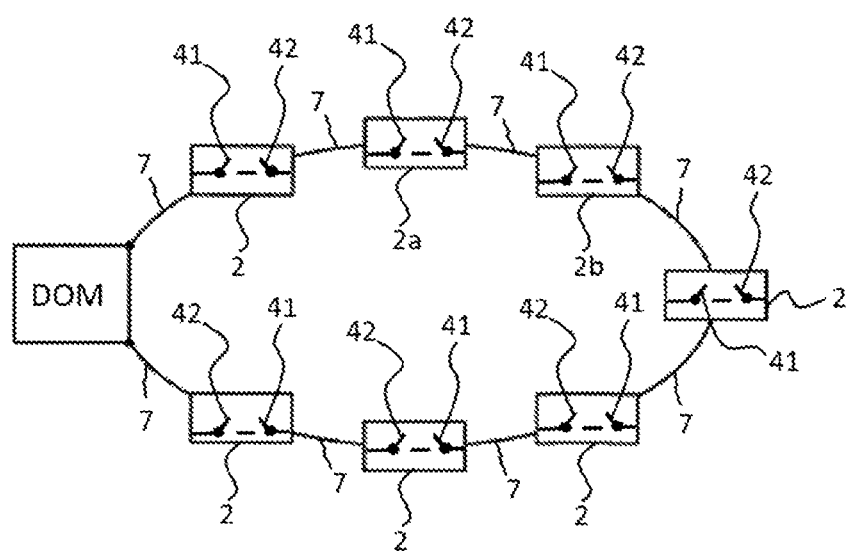
Figure 4:
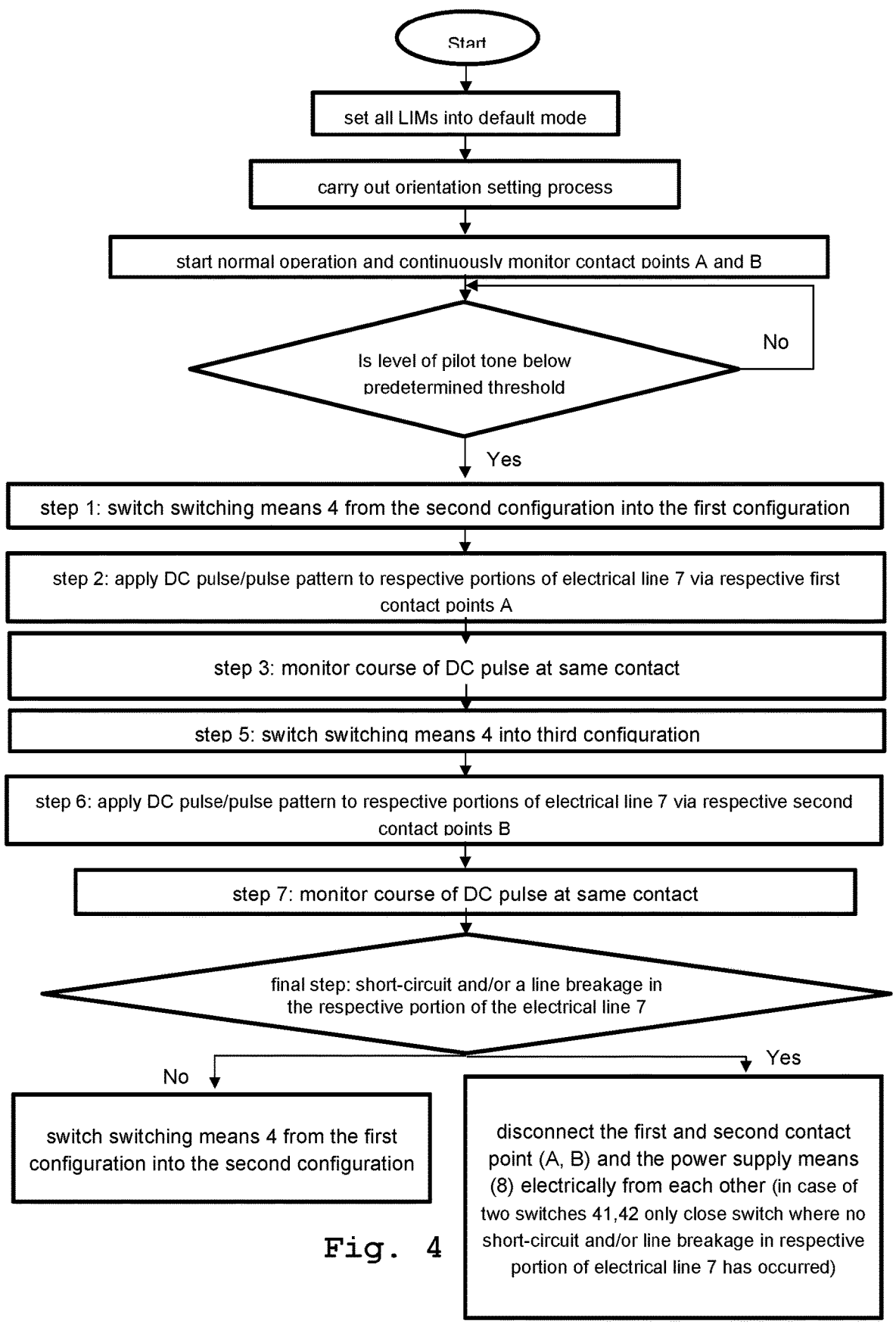

In the following embodiments according to the invention will be described with reference to:

FIG. 1: showing a device for electrically connecting and disconnecting portions of an electrical line of a public address system according to a first embodiment, FIG. 2: showing a device for electrically connecting and disconnecting portions of an electrical line of a public address system according to a second embodiment, FIG. 3: showing a public address system according to the invention, and FIG. 4: showing a flow chart of the method according to the invention.

FIRST EMBODIMENT

By referring to FIG. 1 a device 1 for electrically connecting and disconnecting portions of an electric line 7 of a public address system according to a first embodiment will be described.

The device 1 comprises a control means 6, transforming and rectifying means 81, charging means 83 connecting the transforming and rectifying means 81 to a power source 82 to be charged, and a power supply means 8, to supply the power from the power source to a first contact point. The power source 82, which preferably is a capacitor, can be provided separately from the connecting/disconnecting device 1.

The connecting/disconnecting device 1 further comprises a switching means 4 which is provided between a first contact point A and a second contact point B. The switching means 4 can for example be an electrical circuitry using transistor(s) and/or relay(s). The relay can for example be a mechanical relay using a spring and a coil. Preferably the relay is a bi-stable relay being able to stay in two different stable states without being supplied with energy when the relay is in one of the two stable states and only needs to be supplied with electrical energy for switching between the two stable states. In other words, the switching means 4 has to be configured to electrically connect and disconnect the first and the second contact points A, B. More specifically the switching means 4 has to be configured to switch between the first configuration where the first contact point A and the power supply means 8 are electrically connected with each other and the first and the second contact point A, B are electrically disconnected from each other, and a second configuration where the first contact point A and the power supply means 8 are electrically disconnected and the first and the second contact points A, B are electrically connected with each other.

The connecting/disconnecting device 1 is shown only for one line. In case of a two-wired loop an identical connecting/disconnecting device 1 is provided for the other line of the loop as a combined device, capable of connecting/disconnecting both lines.

As can be seen in FIG. 1, when the switching means 4 is in the first configuration an electrical signal transmitted through the electrical line 7 being received at the first contact point A does not reach the second contact point B and therefore does not reach the respective portion of the electrical line 7 connected to the second contact point B. In other words, the switching means 4 is configured to interrupt a signal and electrical energy transmission via the electrical line 7.

When the switching means 4 is in the first configuration the power source 82 is electrically connected via the power supply means 8 and the switching means 4 to the first contact point A. Therefore, electrical power supplied from the power source 82 can be transmitted through the portion of the electrical line 7 connected to the first contact point A.

The power source 82 connected to the supply means 8 shown in FIG. 1 is a capacitor. The capacitor is shown to be connected between the line and ground. However, in case of a two-wired loop the capacitor will be connected between the two lines.

Nevertheless, the invention is not limited to these specific example of using a capacitor as the power source 82 and also other power sources like for example a rechargeable battery, and/or an electrically connection to an external power supply line can be implemented.

As can be seen in FIG. 1 the power source 82, i.e. the electrical capacitor, can be charged via the transforming and rectifying means 81 and charging means 83 using the power supplied through the electrical line 7. The charging means 83 are electrically connected to transforming and rectifying means 81, which in turn is electrically connected to the first and the second contact point A, B and is configured to transform altering current flowing in the electrical line 7 into direct current. Preferably the transforming and rectifying means 81 will selectively make use only of a small frequency spectrum of the electrical power transmitted through the line, where this small spectrum is outside the audible range.

As an alternative, the power source 82 can be charged via an external DC or AC power supply line and the transforming rectifying means 81 can be connected to the external DC or AC power supply line. In a case where the power source 82 is charged via an external DC power supply line no rectifying is necessary.

Referring back to FIG. 1, beside being configured to transform the altering current supplied via the line 7 into direct current, the transforming and rectifying means 81 may further be configured to output the generated direct current within different voltage ranges and/or different current ranges for driving the control means 6. Different devices such as single-phase-rectifiers, three-phase-rectifiers, and/or voltage-multiplying-rectifiers known from the state of the art can be implemented as the transforming and rectifying means 81. Additionally, it is not necessary to connect the transforming and rectifying means 81 with both, the first and the second contact point A, B. It would also be possible to connect the transforming and rectifying means 81 only with one of the two contact points, the first or the second contact point A, B.

Furthermore, the transforming and rectifying means 81 can comprise a DC-DC converter which is configured to convert a DC-current having a high voltage into a DC-current having a low voltage. That can be necessary, when a high voltage, for example 100 volt, is supplied via the electrical line 7 and is intended to be used for charging the power source 82. Nevertheless, such a DC-DC-current converter is optionally and an implementation thereof depends on the voltage supplied via the line 7 and technical specifications of the power source 82 and/or the charging means 83.

The device 1 for electrically connecting and disconnecting portions of the electrical line 7 of the public address system according to the first embodiment further comprises the above mentioned control means 6. The control means 6 is configured to control the switching means 4 based on at least one electrical characteristic $U_1$, $U_2$, $I_1$, $I_2$ at the first and/or the second contact point A, B. In other words, the control means 6 is configured to measure at least one electrical characteristic $U_1$, $I_1$ at the first contact point A, wherein the electrical characteristic can be at least one of a current, a voltage, and an impedance. The same applies to the second contact point B. In the state of the art, different methods for measuring a current, a voltage and/or impedance are known. It would for example be possible to measure a voltage and/or a current with an inductive measuring method, which is well known from the state of the art, and/or with a voltmeter and an ammeter, respectively.

In a preferred embodiment using a two-wired loop the voltage between the two wired is measured.

Preferably the electric characteristic is determined in a small frequency range. That is, the connecting/disconnecting device 1 is configured to be powered by a pilot signal in a small frequency range, outside the audible range, and the control means 6 will detect the presence or absence of the pilot signal at least one of the contact points.

As described above, the control means 6 is configured to control the switching means 4 such that the switching means 4 switches from the second configuration to the first configuration, when a voltage/pilot signal level $U_1$ at the first contact point A is lower than a predetermined threshold value Uset and/or a voltage/pilot signal level $U_2$ at the second contact point B is lower than the predetermined threshold value Uset. In other words, when a short-circuit occurs in a respective portion of the line 7 connected to one of the contact points A, B, the control means 6 is configured to detect a voltage drop/drop of the level of the pilot signal below the predetermined threshold value Uset by the above described measuring means and to control the switching means 4, such that the electrical connection between the first contact point A and the second contact point B is interrupted.

More specifically, when a short-circuit occurs in the respective portion of the electrical line 7, which is connected to the first contact point A, and/or a short-circuit occurs in the respective portion of the electrical line 7, which is connected to the second contact point B, the switching means 4 is switched from the second configuration to the first configuration by the control means 6. In such a case, the first contact point A is now electrically connected to the power source 82 via the power supply means 8. The power source 82 is configured to apply a DC-signal to the line 7 via the switching means 4 and the first contact point A. When the DC-signal is applied to the respective portion of the line 7 connected to the first contact point A the control means 6 measures the electrical characteristic, i.e. the charging state of the portion of the electrical line between the first contact point A and the second contact point B of a neighbouring connecting/disconnecting device along the electrical line 7. If the portion of the electrical line is intact, the charging of the line—respectively the high level of the voltage supplied from the power supply means—will result in a voltage different from zero, which can be detected by the measuring means.

In a public address system a plurality of connecting/disconnecting devices 1 of the first embodiment are connected via portions of the electrical line 7. A plurality of loudspeakers is connected in parallel, i.e. in a two-wired line between the wires of the tow loops, i.e. "on the line". A control and audio output module is configured to output an audio signal to the plurality of loudspeakers.

In such a public address system all connecting/disconnecting devices 1 will be in the second configuration during normal operation. When a short-circuit and/or a line breakage is detected—e.g. by an interruption of a pilot signal—all the connecting/disconnecting devices 1 will simultaneously switch into the first configuration, i.e. they will interrupt the electrical connection between their respective first and contact points A and B and they will connect the power supply means with their first respective contact point A.

When a short-circuit and/or a line breakage is present in a portion of the electrical line 7, the voltage at the contact point A will remain close to zero, even if the relatively high output voltage level of the power supply means is connected. Therefore, the device 1 for electrically connecting and disconnecting portions of the electric line 7 of the public address system according to the first embodiment of the invention is able to determine, whether a short-circuit has occurred in the respective portion of the electrical line 7 connected to the first contact point A.

Since the connecting/disconnecting device 1 is used as part of the public address system and is connected in series with a plurality of similar connecting/disconnecting devices 1 along the electrical line 7, the connecting/disconnecting device 1 will receive at their second contact point B the DC-signal supplied by the power supply means of a neighbouring connecting/disconnecting device 1, provided that there is no fault in the respective portion of the electrical line 7 connected to the second contact point B. Of course, all connecting/disconnecting devices 1 have to be arranged so as to have the same orientation.

If the voltage level at the second contact point B raises, the connecting/disconnecting device 1 will decide, that the portion of the electrical line 7 connected with the second contact point B is free of fault. On the other hand, if the level of the voltage remains low, the connecting/disconnecting device 1 will decide, that the portion of the electrical line 7 connected with the second contact point B is interrupted or has a short-circuit. Thus the connecting/disconnecting device 1 of the first embodiment is able to detect the presence/absence of a short-circuit and/or a line breakage on both portions of the electrical line 7, to which the first and second contact points A, B are connected, respectively.

When it is detected that no fault is present at all, the connecting/disconnecting devices 1 will almost simultaneously switch from the first configuration back into the second configuration and thus will close the loop. If on the other hand there is a fault within the electrical line 7, the two connecting/disconnecting devices 1 immediately adjacent to the fault will remain in the first configuration, while all other connecting/disconnecting devices 1 will almost simultaneously switch into the second configuration. The public address system will then operate as two spur or branch lines.

The two connecting/disconnecting devices 1 immediately adjacent to the short-circuit preferably will interrupt the supply of power through the power supply means 8 to the contact point A after a predetermined time, in order to avoid a complete discharge of the power source 82.

Since the determining of the presence/absence of the fault, i.e. the short-circuit or the line breakage, is done simultaneously for all portions of the electrical line 7, the time needed for this determining is greatly reduced compared to the state of the art, where the respective portions of the electrical line are judged sequentially. Additionally, since the two connecting/disconnecting devices 1 located immediately adjacent to the fault will remain in the first configuration, the entire process of re-establishing the operation of the public address system can be accelerated compared to the repeated sequential connecting operations of the state of the art described above.

In the first embodiment, the control and audio output module is configured to output a pilot signal via the electrical line 7. The control and audio output module is configured to output a constant pilot tone as the above mentioned pilot signal to the electrical line 7, wherein the pilot tone is preferably outside the audible range and between 10 Hz to 25 kHz, more preferably in a range from 10 Hz to 20 Hz, furthermore preferably in a range from 20 kHz to 25 kHz, most preferably at 22 kHz, and the control means 6 is configured to control the switching means 4 based on the pilot tone outputted by the control and audio output module.

More specifically, the control means 6 of each connecting/disconnecting device 1 of the public address system is configured to measure by measuring means accommodated in the control means 6, if the pilot signal output by the control and audio output module is received at the respective contact point, the first contact point A and/or the second contact point B. In a case, where the control means 6 recognizes, that the pilot signal output by the control and audio output module is no longer received at the first contact point A and/or the second contact point B of one of the connecting/disconnecting devices 1, the control means 6 controls the switching means 4 such that the switching means 4 switches into the first configuration, as described above.

In other words, when the pilot signal is no longer received by one of the connecting/disconnecting devices 1, it is assumed that a fault in the electrical line 7 has occurred. Then, the switching means 4 of this connecting/disconnecting devices 1 switches from the second configuration into the first configuration and therefore provides an electrical connection between the first contact point A and the power source 82 via the power supply means 8 while simultaneously electrically disconnecting the first and the second contact points A, B from each other.

Subsequently, the above process for re-establishing the operation of the public address system is started.

As mentioned above, it is necessary that all connecting/disconnecting devices arranged along the line have the same orientation. This can be assured by mechanical connections allowing only the connection of the portions of the line in one way.

In a modified first embodiment the output voltage of the power supply means 8 is modulated in the form of a DC-signal comprising a single DC-pulse or preferably a DC pulse pattern. Since the plurality of devices 1 of the public address system are connected along the electrical line 7 a connecting/disconnecting device 1 next to the one connecting/disconnecting device 1, applying the DC-signal to the respective first contact point A, can measure at its second contact point B, whether the DC pulse/the DC pulse pattern outputted by the one connecting/disconnecting device 1 reaches the second contact point B thereof.

The connecting/disconnecting device 1 is further provided with a second switching means (not shown) to disconnect the power supply means 8 from the first contact point A and to connect the power supply means 8 to the second contact point B, while keeping the electrical isolation between the two contact points A, B. This second switching means is operated after a predetermined first delay time. The single DC-pulse or preferably the DC pulse pattern is subsequently applied to the second contact point B and can be received at the first contact point A of the neighbouring connecting/disconnecting device 1, within a second predefined delay time.

When the control means 6 of a connecting/disconnecting device 1 has measured at both contact points A, B the DC pulse/the DC pulse pattern within the first and second delay times, respectively, the control means 6 controls the switching means 4 such, that the connecting/disconnecting device 1 returns to the second configuration. Otherwise, the connecting/disconnecting device 1 remains in the first configuration and disconnects the first contact point A and the second contact point B, i.e. interrupts the electrical line 7, and therefore isolates the fault occurred in a respective portion of the line 7.

In this modified embodiment the switching of the second switching means has to be performed simultaneously for all the connecting/disconnecting devices 1 along the electrical line. This is achieved by means of a switching time control using the predetermined first and second delay times, which is triggered by the switching of the first switching means 4 from the second configuration into the first configuration.

Compared to the first embodiment the modified first embodiment has the drawback that the re-establishment of the public address system will not be complete until the lapse of first and second delay times. However, the detection of a well defined DC-pulse or pulse pattern is easy to implement, especially when limited power can be provided by the power source 82, so that it might be difficult to raise the voltage level of a long portion of the electrical line to a detectable level.

Advantageously the first modified embodiment is equipped with a resetting means for setting the connecting/disconnecting device 1 into a default mode, an orientation determining means for determining in the default mode at which contact point the pilot signal is detected first, and a configuration setting means for setting the contact point receiving the pilot signal first as first contact point A and the other contact point as second contact point B.

That is, in the default mode all connecting/disconnecting devices 1 are in the first configuration and the power source 82 not apply power to the respective contact portions, either since they are (turn of) turned off or since they might be discharged. Subsequently the pilot signal and/or a switch closing pulse is applied form the control and audio output module to one end of the electrical line 7. The first connecting/disconnecting device 1 along the electrical line 7 will receive the pilot signal/switch closing pulse, charge its power source—if needed—and bring than the switch means 4 into the second configuration. As a consequence, the pilot signal/next switch closing pulse will reach the second connecting/disconnecting device 1 along the electrical line 7, which will than charge its power source—if needed—and switch the switching means 4 into the second configuration. This process will continue until the loop is closed and the control and audio output module receives its own pilot signal/switch closing pulse through the other end of the electrical line 7. During this operation each connecting/disconnecting device 1 will recognize whether the pilot signal/switch closing pulse has been supplied via contact point A or B, and will accordingly define said contact point—having received the pilot signal/switch closing pulse first—as the first contact point, so as to set the orientation. Preferably the connecting/disconnecting device has a reset switch for resetting the device into the default mode. The reset switch can be implemented as software.

Of course this orientation setting procedure can be implemented as well with the first embodiment as described above.

SECOND EMBODIMENT

By referring to FIG. 2 a device 2 for electrically connecting and disconnecting portions of an electric line 7 of a public address system according to a second embodiment will be described.

In order to avoid rewording only differences between the first and the second embodiment will be described.

In difference to the first embodiment the device 2 according to the second embodiment comprises a switching means 4 having two switches, i.e. a first switch 41 and a second switch 42 (see FIG. 2). Between the first switch 41 and the second switch 42 a terminal for connecting a device 2, such as a loudspeaker, is provided. The first switch 41 is configured to electrically connect the first contact point A and the power supply means 8, and the second switch 42 is configured to electrically connect the second contact point B and the power supply means 8. The control means 6 is configured to independently and separately control the first and the second switches 41, 42.

A public address system according to the invention comprises a plurality of devices 2 according to the second embodiment for electrically connecting and disconnecting portions of an electric line 7. Furthermore, a control and audio output module is connected to the line 7 and configured to output an audio signal and/or a pilot signal, which is a pilot tone, to the line 7. The electrical line 7 with the plurality of devices 2 forms a loop line starting and ending at the control and audio output module.

It goes without saying that in a preferred embodiment two loops are provided and the connecting/disconnecting device is provided symmetrically for each loop, i.e. in this case the connecting/disconnecting device will comprise four switches, two switches on each loop.

By start-up of the public address system each of the devices 2 will be in the default mode. The control and audio output module will start to supply the pilot signal and/or a switch closing pulse and/or the audio signal to one end of the line 7 of one loop. The first and the second switch 41, 42 are in an open state, i.e. in a first configuration where the first contact point A and the second contact point B are electrically disconnected from each other, while the first contact point A and the second contact point B are electrically connected to the power supply means 8, respectively.

The power source 82 will begin to be charged by the power transmitted through the electrical line 7. Once the power level of the power source 7 is enough for powering the operation of the connecting/disconnecting device 2, the control means 6 will decide whether the pilot signal is applied at contact point A or contact point B or whether a switch closing pulse is received at contact point A or contact point B.

The control means 6 stores a timing information concerning to which one of the first and the second contact point A, B the pilot signal, the switch closing pulse and/or the audio signal has been applied first. In general, the control means 6 stores a timing information concerning the at least one electrical characteristic U1, U2, I1, I2 at the first and the second contact point A, B. The first contact point A, B is then the contact point to which the at least one electrical characteristic, i.e. the pilot signal or the switch closing pulse, has been applied first. In conclusion, the other contact point is then the second contact point B.

When the control means 6 detects/measures the at least one electrical characteristic U1, U2, I1, I2 at the first contact point A of the device 2, the switching means 4 is controlled by the control means 6 to switch into a second configuration where the first contact point A and the second contact point B are electrically disconnected from the power supply means 8, and where the first and the second contact points A, B are electrically connected with each other, i.e. the first and the second switch 41, 42 are closed.

In a normal operation mode, the electrical line 7 form together with the plurality of devices 2 a closed loop starting and ending at the control and audio output module, i.e. the loudspeaker loop is closed during normal operation. In other words, in the normal operation of the public address system the switching means 4 is in the second configuration, where the first contact point A and the power supply means 8 are electrically disconnected, the second contact point B and the power supply means 8 are electrically disconnected, and the first and the second contact points A, B are electrically connected with each other via the first and the second switch 41, 42.

In case of absence of the pilot signal outputted by the control and audio output module, for example a constant 22 kHz tone, all the devices 2 detect a short-circuit and/or a line breakage at the loudspeaker loop, respectively. The control means 6 switches the switching means 4 into the first configuration by opening the first switch 41. In other words, according to a method for detecting a failure in the electrical line 7 of the public address system the switching means 4 is switched from the second configuration into the first configuration in a first step when a failure in the line 7 occurs.

Then all devices 2 will send a DC pulse, preferably a DC-pulse pattern, via their first switch 41 to the respective portion of the line 7 connected to the first contact point A.

More specifically, during the DC pulse/the DC pulse pattern each device 2 carries out at least one but preferably several voltage measures to distinguish whether the respective portion of the line 7 is free from short-circuit and/or a line breakage. Additionally, in an modified embodiment the control and audio output module might monitor whether it receives the DC-signal from the first connecting/disconnecting device 2 of the loop.

In general, in a second step at least one electrical characteristic is measured at the first and/or the second contact point A, B by the control means 6. A result of the measurements is stored in the device 2 and the first switch 41 is closed again, so as to disconnect the power supply means 8 and the first contact point A. More specifically, the first switch 41 is switched by the control means 6 to be in a state of electrically disconnecting the first contact point A and the power source 82 via the power supply means 8.

Simultaneously with the closing of the first switches 41, all devices 2 will open their second switch 42 and send the DC pulse, preferably the DC pulse pattern, to the respective portion of the line 7 connected to the second contact point B. During the DC pulse/the DC pulse pattern each device 2 carries out several voltage measures to distinguish whether the respective portion of the line 7 is short-circuit and/or a line breakage free. In a modified embodiment, the control and audio output module can monitor whether it receives the DC-pulse/DC pulse pattern from the last connecting/disconnecting device 2 of the loop. Again, a result of the measurements may be stored in the respective connecting/disconnecting device 2.

If both portions, the respective portion of the line 7 connected to the first contact point A and the respective portion of the line 7 connected to the second contact point B, are indicated to be short-circuit and/or line breakage free, the switching means 4 is switched to the second configuration, i.e. both switches 41,42 are closed.

All devices 2 that have been decided to be short-circuit free and/or line breakage free for the respective portion of the line 7 connected to the first contact point A, will switch their first switch 41 in a configuration of connecting the loudspeaker terminal to the line 7 via the first switch 41, otherwise the first switch is electrically connected to the power supply means 8 and electrically disconnects the loudspeaker terminal from said portion of the electrical line 7.

All devices 2 that have been decided to be short-circuit free and/or line breakage free for the respective portion of the electrical line 7 connected to the second contact point B, will switch their second switch 42 in a configuration of connecting the loudspeaker terminal to the line 7 via the second switch 42, otherwise the second switch is electrically connected to the power supply means 8 and electrically disconnects the loudspeaker terminal from said portion of the electrical line 7.

Subsequently the control means 6 will interrupt the supply of power through the power supply means 8 in those connecting/disconnecting devices, where one of the switches 41, 42 remains in the open state.

The first device 2 directly connected to the control and audio output module switches its first switch 41 in a configuration of connecting the loudspeaker terminal to the line 7 via the first switch 41 in any case. This device will additionally maintain the second switch so as to disconnect the line, in order to avoid that the pilot signal is forwarded to the next connecting/disconnecting device along the loop, in order to give the other connecting/disconnecting devices enough time to check the respective line portions. The first connecting/disconnecting device usually is provided as an integral part of the control and audio output module. Accordingly, a corresponding operation mode as first connecting/disconnecting device can be easily implemented.

Alternatively, it is possible to configure some or all connecting/disconnecting devices such that, for the case that after a recognition of a short circuit and opening of the switches, the pilot signal is immediately received at one of the contact points A, B, the corresponding connecting/disconnecting device will decide that it is a first connecting/disconnecting device and will close the switch on the side towards the control and audio output module and will keep the other switch open until the lapse of a predetermined waiting time, e.g. 1 to 4 seconds.

The last device 2 directly connected to the control and audio output module will behave in the same manner and switches its second switch 42 in a configuration of connecting the loudspeaker terminal to the line 7 via the second switch 42 in any case, as long as it receives the pilot signal. Again this last connecting/disconnecting device usually will be provided as an integral part of the control and audio output module.

Because all devices 2 on the loop work simultaneously, a short-circuit on the loop is separated and the operation of the public address system is re-established fast and reliable independent of the number of devices 2 in the public address system.

Furthermore, it is possible to connect the power source 82 via the power supply means 8 between the first and the second switch 41, 42 similar to the loudspeaker.

In case of a failure at the loudspeaker itself, detected by the devices 2 as described above, each device 2 opens both of its switches and is then completely isolated.

All devices 2—except the first connecting/disconnecting device of the loop, close their first switch 41 and send a DC pulse, preferably a DC pulse pattern, to the respective portion of the line 7 connected to the first contact point A. During the DC pulse/DC pulse pattern several voltage measures take place to distinguish whether the respective portion of the line 7 is short-circuit and/or line breakage free. The result is stored in the device 2 and the first switch 41 is opened again.

All devices 2, except the last connecting/disconnecting device, close their second switch 42 and send the DC pulse, preferably the DC pulse pattern, to the respective portion of the line 7 connected to the second contact point B. During the DC pulse/DC pulse pattern several voltage measures take place to distinguish whether the respective portion of the line 7 connected to the second contact point B is short-circuit and/or line breakage free.

If the investigated part of the loop is indicated short-circuit free and/or line breakage free the second switch 42 remains closed, otherwise the second switch 42 opens again.

Because all devices 2 on the loop work simultaneously, a short-circuit on the loop is separated and the operation of the public address system is re-established fast independent of the number of device 2 on the loop.

Finally, the first and the last connecting/disconnecting device will close their respective switch on the side towards the control and audio output module and so reestablish the operation of the loop.

In a modified second embodiment the first and second switches 41, 42 are reversed. That is, in FIG. 2, if both switches 41 and 42 are open, connecting their respective contact point and the power supply means, the power of the power supply means is applied to both portion of the electrical line. Therefore, in order to avoid a complete discharge of the power source 82, the connecting/disconnecting device 2 has to be provided with means for stopping the power supply after a certain time.

In the modified second embodiment, the switches 41 and 42 are reversed, so that the switches 41, 42 will connect the power supply means with the line connecting both switches 41, 42. Therefore, even if both switches remain in this position, no significant discharge of the power source 82 is to be expected.

FIG. 3 shows a configuration of a public address system. A control and audio output module, although called digital output module DOM, is connected with an electrical line 7 arranged so as to form a loop. At more or less regular intervals along the electrical line a plurality of connecting/disconnecting devices 2—also called line interrupt module LIM—are provided. Each LIM is associated with a loudspeaker. The LIMs of this system correspond to the modified second embodiment.

In the normal operation all LIMs are in the second configuration and the pilot signal is applied from the DOM to the electrical line 7 in e.g. a clockwise direction. If e.g. a short circuit, in general a fault, develops between the LIMs 2a and 2b the level of the pilot signal will drop at all LIMs and all LIMs will switch into the first configuration. After testing the respective portions of the electrical line 7 to which a LIM is connected, the LIM will return into the second configuration, provided that no short circuit is detected in one of said two portions. However, the LIM 2a will detect a short circuit in the portion connecting LIM 2a and 2b and will close only the first switch 41 and will keep the second switch 42 open. The LIM 2b on the other hand will as well detect the short-circuit and will close only the second switch 42 and will keep the first switch 41 open. The DOM will recognize that the pilot signal does not reach the DOM at the other end of the electrical line 7 and will conclude that there is a short-circuit. Consequently, the DOM will apply the pilot signal and the audio signal on both ends of the electrical line 7, and the system will operate as a two branch lines.

FIG. 4 shows a flow chart for explaining the operation of the connecting/disconnecting device of the invention.

At the beginning, i.e. after the installation of the public address system all the LIMs are in the default mode or will be set into the default mode.

Then the orientation setting process is carried out, as described for the first modified embodiment or for the second embodiment. At the end of this process all LIMs will know their orientation and will be set into the second configuration. The loop will be closed and the normal operation can start.

If necessary an additional position determining step will be carried out, so as to allow each LIM to identify its position along the loop, i.e. whether it is a first or last LIM.

All LIMs will continuously monitor the contact points A and B for the pilot signal during normal operation. If the level of the pilot signal drops below a predetermined threshold value, the re-establishment process of the invention will be carried out.

In a first step the switching means 4 of the connecting/disconnecting devices 1 will switch from the second configuration into the first configuration upon detecting an interruption of the pilot signal.

In a second step the respective power supply means 8 will apply a DC pulse or pulse pattern (electrical power) to the respective portions of the electrical line 7 via the respective first contact points A.

In a third step the reception of the DC pulse pattern at the other contact point B is monitored, in order to determine the absence of a short-circuit and/or a line breakage in the respective portion of the electrical line 7.

In a fifth step the switching means 4 are switched into a third configuration where the second contact point B and the power supply means 8 are electrically connected with each other, while the first and the second contact point A, B are electrically disconnected from each other, and while the first contact point A and the power supply means 8 are electrically disconnected from each other.

In a sixth step the respective power supply means 8 applies the DC-pulse or pulse pattern to the respective portions of the electrical line 7 via the respective contact points B.

In a seventh step the reception of the DC pulse pattern at the other contact point A is monitored, in order to determine the absence of a short-circuit and/or a line breakage in the respective portion of the electrical line 7.

In a final step (fourth step) either a switching from the first configuration into the second configuration, if the third step detects the absence of a short-circuit and/or a line breakage in the respective portion of the electrical line 7, or a keeping the first configuration if the third step detects a short-circuit and/or a line breakage in the respective portion of the electrical line 7 are carried out.

Subsequently, the normal operation of the public address system is re-established, and the system will operate either as a loop, if no short circuit or line breakage could be detected at all, or it will operate as two stich or branch lines.

Although advantageous embodiments have been described, a person skilled in the art is aware that he can combine these embodiments in an appropriate manner. E.g. it is possible to use LIMs according to the modified first embodiment together with LIMs of the second embodiment along the same electrical line.

Furthermore, in the second embodiment the DC-pulse or pulse pattern output by the LIMs can be replaced by signal corresponding to the pilot signal, e.g. a sinus wave of 22 kHz. This will allow to simplify the LIMs, since the LIMs will have to be configured only to monitor one frequency. In this case the LIMs should be configured so as to keep the first configuration for the entire delay time, regardless of the presence or absence of the pilot signal.

The invention claimed is:

1. A device for electrically connecting and disconnecting portions of an alternating current electrical line of a public address system, wherein the device comprises:
 a switch configured to electrically connect and disconnect a first and a second contact point, wherein the first and the second contact point are configured to be electrically connected to respective portions of the alternating current electrical line,
 a controller configured to control the switch based on at least one electrical characteristic at the first and/or second contact point,
 a power supply configured to be electrically connected to the first contact point via the switch,
 wherein the switch is configured to switch between:
 (a) a first configuration where the first contact point and the power supply are electrically connected with each other while the first and the second contact point are electrically disconnected from each other, and
 (b) a second configuration where the first contact point and the power supply are electrically disconnected while the first and the second contact point are electrically connected with each other,
 wherein the device is configured to:
 reset into a default mode, and
 determine in the default mode at which contact point a pilot signal is detected first, wherein a power source is charged using power supplied by the pilot signal.

2. The device according to claim 1, further comprising:
 a transforming and rectifying means which is electrically connected to at least one of the first and the second contact point and is configured to transform alternating current supplied via the alternating current electrical line into direct current, and
 a charging means for charging the power source connected to the power supply with the direct current.

3. The device according to claim 2, wherein the device is further configured to control the switch such that the switch switches from the second to the first configuration when a voltage at the first contact point is lower than a predetermined threshold value and/or a voltage at the second contact point is lower than the predetermined threshold value.

4. The device according to claim 2, wherein the switch further comprises a first switch and a second switch electrically connected to each other in series between the first contact point and the second contact point.

5. The device according to claim 2,
 wherein the device is further configured to store a timing information concerning the at least one electrical characteristic at the first and the second contact point.

6. The device according to claim 1, wherein the device is further configured to control the switch such that the switch switches from the second to the first configuration when a voltage at the first contact point is lower than a predetermined threshold value and/or a voltage at the second contact point is lower than the predetermined threshold value.

7. The device according to claim 6, wherein the switch further comprises a first switch and a second switch electrically connected to each other in series between the first contact point and the second contact point.

8. The device according to claim 6,
 wherein the device is further configured to store a timing information concerning the at least one electrical characteristic at the first and the second contact point.

9. The device according to claim 1, wherein the switch further comprises a first switch and a second switch electrically connected to each other in series between the first contact point and the second contact point.

10. The device according to claim 9,
 wherein the device is further configured to store a timing information concerning the at least one electrical characteristic at the first and the second contact point.

11. The device according to claim 1,
 wherein the device is further configured to store a timing information concerning the at least one electrical characteristic at the first and the second contact point.

12. The device according to claim 1,
 wherein the power supply is configured to apply at least one DC pulse, preferably a DC pulse pattern, to the alternating current electrical line, and
 the device is configured to control the switching from the first to the second configuration depending on detection of the at least one DC pulse or the DC pulse pattern received via the alternating current electrical line, in order to detect an absence of a short-circuit and/or a line breakage.

13. The device according to claim 1, further configured to:
 set the contact point receiving the pilot signal first as first contact point and the other contact point as second contact point.

14. A public address system comprising:
 a plurality of connecting/disconnecting devices including:
 a switch configured to electrically connect and disconnect a first and a second contact point, wherein the first and the second contact point are configured to be electrically connected to respective portions of an alternating current electrical line,
 a controller configured to control the switch based on at least one electrical characteristic at the first and/or second contact point, and
 a power supply configured to be electrically connected to the first contact point via the switch,
 wherein the switch is configured to switch between:
 (a) a first configuration where the first contact point and the power supply are electrically connected with each other while the first and the second contact point are electrically disconnected from each other, and (b) a second configuration where the first contact point and the power supply are electrically disconnected while the first and the second contact point are electrically connected with each other, and the alternating current electrical line comprising a plurality of portions connecting the plurality of connecting/disconnecting devices to each other, a plurality of loudspeakers connected in parallel to the line, and an output module connected to the alternating current electrical line and configured to output an audio signal to the alternating current electrical line and output a pilot signal to the alternating current electrical line, wherein a power source is charged using power supplied by the pilot signal.

15. The public address system according to claim 14, wherein the pilot signal is in a range from 10 Hz to 25 kHz, and
a control means is configured to control the switch based on the pilot signal.

16. A method for detecting a failure in an alternating current electrical line of the public address system, the method comprising:

switching a switch configured to electrically connect and disconnect a first and a second contact point, wherein the first and the second contact point are configured to be electrically connected to respective portions of the alternating current electrical line, from a second configuration into a first configuration upon detecting an interruption of a pilot signal, wherein a power source is charged using power supplied by the pilot signal, wherein the first configuration is where the first contact point and a power supply are electrically connected with each other while the first and the second contact point are electrically disconnected from each other, and wherein the second configuration is where the first contact point and the power supply are electrically disconnected while the first and the second contact point are electrically connected with each other, applying by the power supply electrical power to the respective portions of the alternating current electrical line via the respective first contact points, measuring at least one electrical characteristic at the first and/or the second contact points in order to determine an absence of a short-circuit and/or a line breakage in the respective portion of the alternating current electrical line; and either:

switching from the first configuration into the second configuration, if the measured characteristic detects the absence of the short-circuit and/or the line breakage in the respective portion of the alternating current electrical line, or disconnect the first and second contact point and the power supply electrically from each other if the measured characteristic detects the short-circuit and/or the line breakage in the respective portion of the alternating current electrical line.

17. The method according to claim 16, further comprising, switching the switch in a third configuration where the second contact point and the power supply are electrically connected with each other, while the first and the second contact point are electrically disconnected from each other, and while the first contact point and the power supply are electrically disconnected from each other, applying by the power supply electrical power to the respective portions of the alternating current electrical line via the respective contact points, and measuring the at least one electrical characteristic at the first and/or the second contact point in order to determine the absence of a short-circuit and/or a line breakage in the respective portions of the alternating current electrical line; wherein the switching, applying, and measuring are performed after measuring the at least one electrical characteristic.

18. The method according to claim 16, wherein the switch comprises a first switch corresponding to the first contact point and a second switch corresponding to the second contact point and a loudspeaker terminal for connecting a loudspeaker provided between the first switch and the second switch, wherein the first switch is switched based on the electrical characteristic at the first point, and the second switch is switched based on the electrical characteristic at the second point.

19. The method according to claim 16, wherein the power supply of connecting/disconnecting devices applies at least one DC pulse, preferably a DC pulse pattern, to the line, and carries out several voltage measurements corresponding to the DC pulse, preferably to the DC pulse pattern, in order to detect an absence of a short-circuit and/or a line breakage at the respective portion of the alternating current electrical line.

20. The method according to claim 16, wherein results of each measurement are stored in a storage of a connecting/disconnecting device.

* * * * *